US006975616B2

(12) United States Patent
Stephenson et al.

(10) Patent No.: US 6,975,616 B2
(45) Date of Patent: Dec. 13, 2005

(54) BATCH ROUND ROBIN POLLING METHOD FOR RETURN LINK COMMUNICATIONS BETWEEN A MOBILE PLATFORM AND A BASE STATION

(75) Inventors: Gary V. Stephenson, Bellevue, WA (US); David S. Parkman, Mercer Island, WA (US); Michael de La Chapelle, Bellevue, WA (US); Paulus J. Martens, Seattle, WA (US)

(73) Assignee: The Boeing Company, Chicago, IL (US)

( * ) Notice: Subject to any disclaimer, the term of this patent is extended or adjusted under 35 U.S.C. 154(b) by 913 days.

(21) Appl. No.: 09/851,535

(22) Filed: May 8, 2001

(65) Prior Publication Data

US 2002/0167917 A1  Nov. 14, 2002

(51) Int. Cl.[7] ................................................. H04J 3/14
(52) U.S. Cl. ....................... 370/346; 370/449; 455/427; 455/431
(58) Field of Search ............................... 370/313, 316, 370/321, 322, 328, 329, 337, 338, 340, 341, 370/336, 348, 443, 444, 400, 401, 437, 449, 370/450, 345, 346; 455/427, 431, 450, 455, 455/12.1, 509, 516

(56) References Cited

U.S. PATENT DOCUMENTS

| | | | |
|---|---|---|---|
| 5,245,612 A | | 9/1993 | Kachi et al. |
| 5,633,875 A | * | 5/1997 | Hershey et al. .............. 370/346 |
| 5,708,963 A | | 1/1998 | Mobley et al. |
| 5,875,402 A | | 2/1999 | Yamawaki |
| 5,956,639 A | | 9/1999 | Armbruster et al. |
| 5,991,279 A | * | 11/1999 | Haugli et al. ................ 370/311 |
| 6,008,758 A | | 12/1999 | Campbell |
| 6,044,323 A | * | 3/2000 | Yee et al. .................... 701/120 |
| 6,643,274 B2 | * | 11/2003 | D'Annunzio ................ 370/316 |
| 6,650,869 B2 | * | 11/2003 | Kelly et al. ................. 455/13.2 |

OTHER PUBLICATIONS

R. Aubele, et al.; "Communications with Aircraft via Satellite", Electrical Communication, vol. 51, No. 4, 1976; pp. 264-269.

* cited by examiner

Primary Examiner—Ricky Ngo
Assistant Examiner—Duc Duong
(74) Attorney, Agent, or Firm—Harness Dickey & Pierce P.L.C.

(57) ABSTRACT

A polling system and method for establishing forward and return communication links with a plurality of mobile platforms operating within a given coverage region, and further which provides preliminary return channel assignments with each polling message. Each polling message further has an associated ID code designating a particular mobile platform which is registered with a network operations center (NOC) of the system. If the mobile platform does not respond on its designated preliminary return channel within a given time period (e.g., 5 seconds) than the preliminary return channel is returned to a database of available return channels. Polling is carried out more expeditiously because groups of mobile platforms are polled simultaneously and provided with preliminary return channels which accompany the polling messages, and which direct each mobile platform to a designated return channel to use in establishing a return communications link. Polling groups are further sized according to available communication resources.

16 Claims, 6 Drawing Sheets

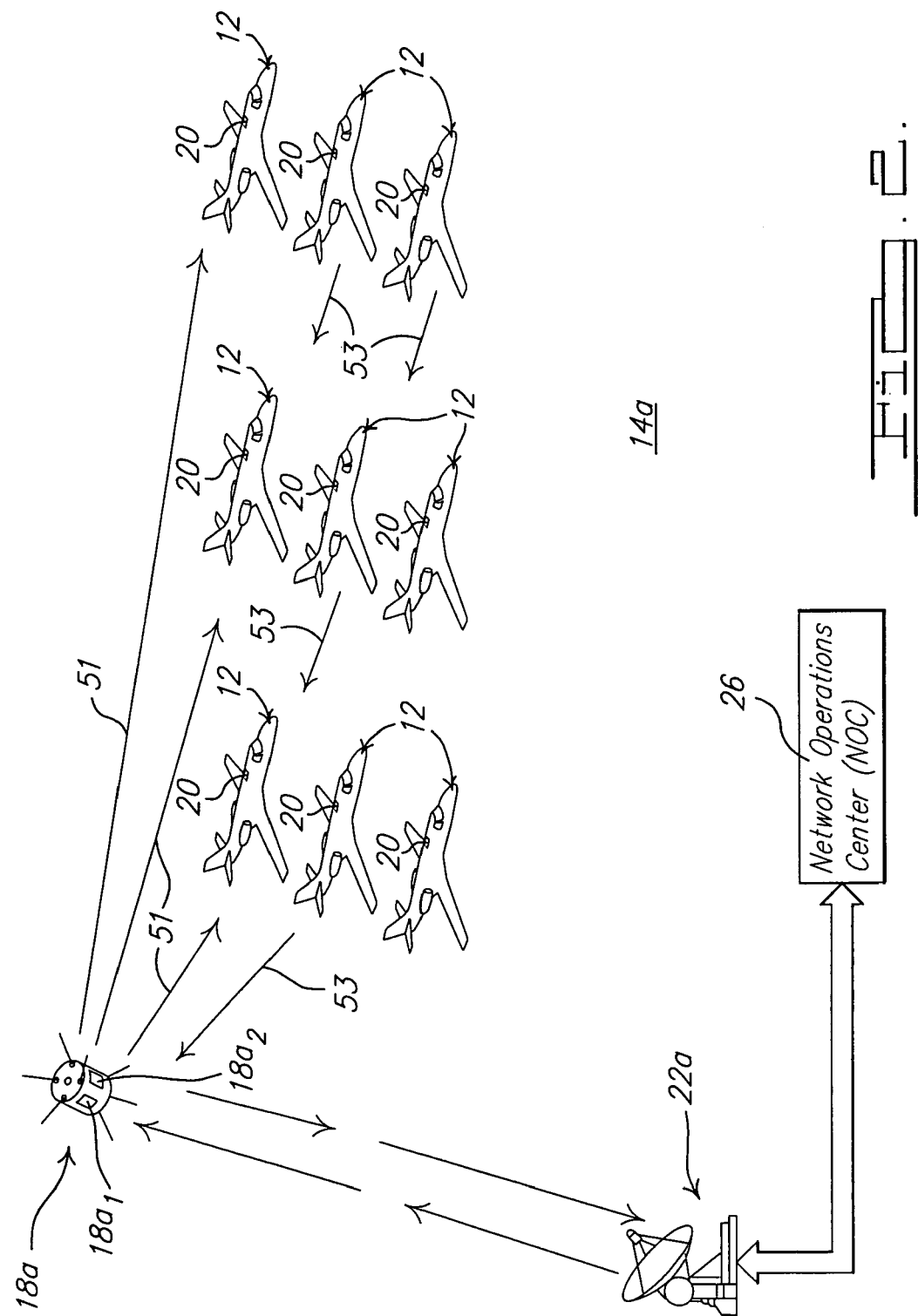

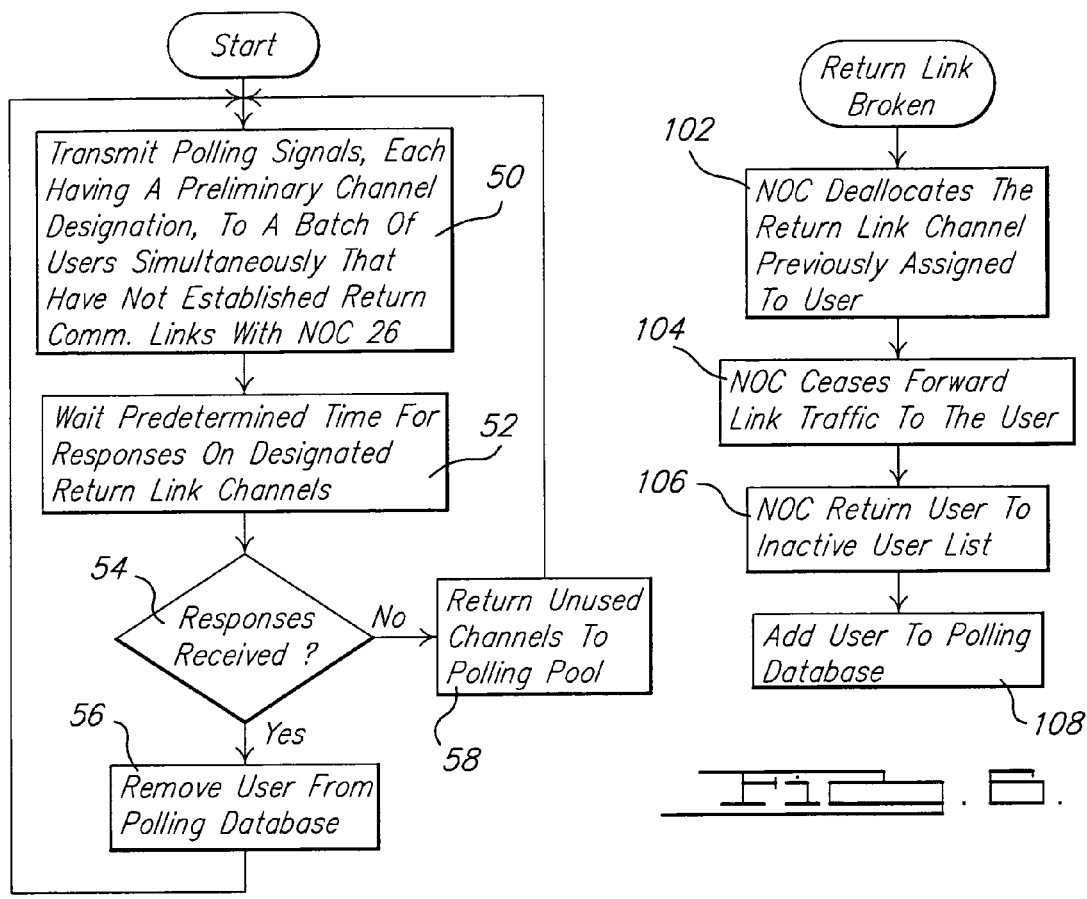
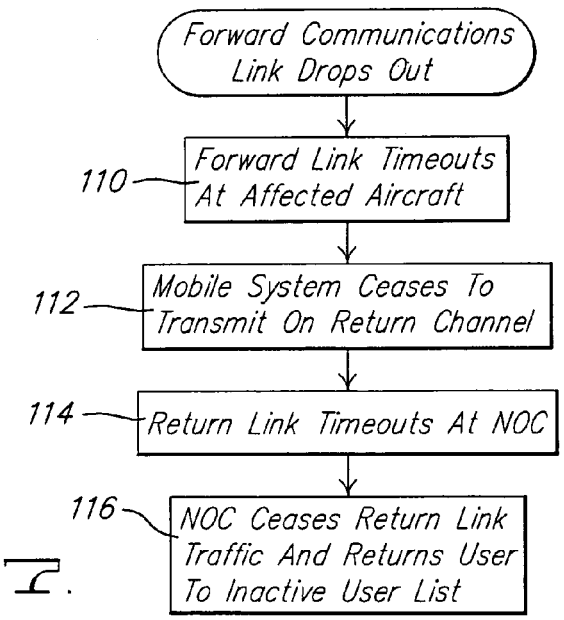

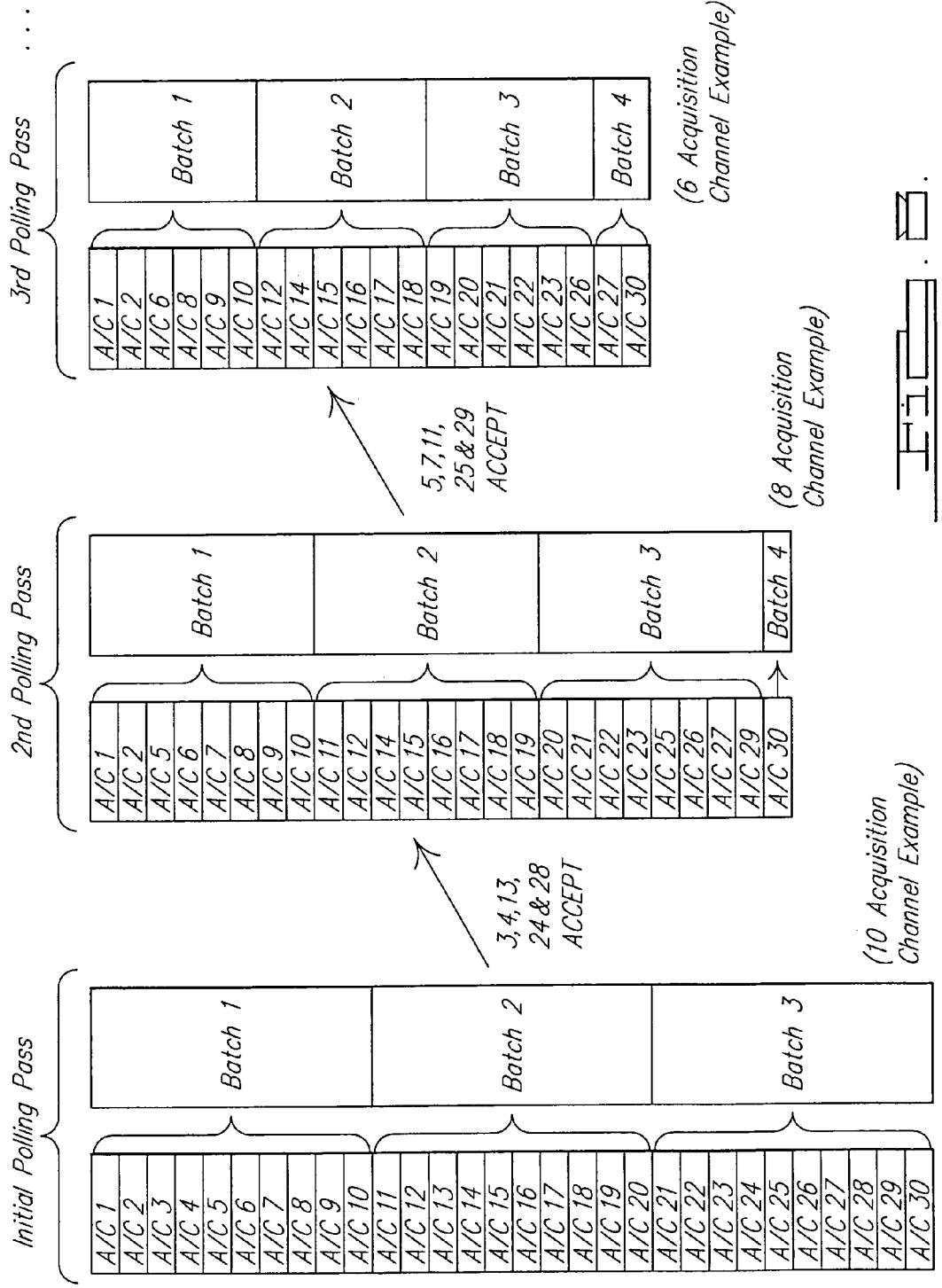

BATCH ROUND ROBIN POLLING METHOD FOR RETURN LINK COMMUNICATIONS BETWEEN A MOBILE PLATFORM AND A BASE STATION

FIELD OF THE INVENTION

The present invention relates to systems and methods for facilitating communications and data content transfer between a base station and a mobile platform via a satellite-based transponder, and more particularly to such a system and method which simultaneously polls a number of mobile platforms within a given coverage region and provides a designated return channel to each mobile platform over which each may simultaneously respond to a poll via communication with the base station.

BACKGROUND OF THE INVENTION

Broadband data and video surfaces, on which our society and economy have grown to depend, have heretofore generally not been readily available to users on board mobile platforms such as aircraft, ships, trains, automobiles, etc. While the technology exists to deliver such services to all forms of mobile platforms, past solutions have been generally quite expensive, low data rate and/or available to only very limited markets of government/military users and some high-end maritime markets (i.e., cruise ships).

At present, a wide variety of data services can be provided via a satellite link from a ground-based radio frequency transceiver. Such data services may include conventional Internet services such as email, web browsing, net meeting, as well as virtual private networks (VPNS) for corporate and government customers.

One particular problem with establishing communication links between numbers of mobile platforms operating within a given coverage region, and a single base station, for example a ground-based RF transceiver, is the difficulty in quickly establishing communications links with each of the mobile platforms. For example, with commercial air traffic dozens of aircraft may be moving into and out of a given coverage region throughout any given time period. In this situation, it is critical that each aircraft be able to quickly establish a communications link with the base station within the coverage region which it is traversing without interfering with communication links already established with the base station by other aircraft. It is also important that the bandwidth assigned to any given aircraft can be modified to accommodate, as best as possible, the bandwidth demands of each aircraft to handle the volume of data content being transmitted from the aircraft back to the ground station.

It is also important that any such system as described above which is intended to facilitate a return communications link for a mobile platform, such as an aircraft, needs to be able to quickly deduce that the aircraft is not responding to a polling signal and then to reallocate the specific return channel to other aircraft which may be requesting additional bandwidth to handle increased data rate transmission needs.

SUMMARY OF THE INVENTION

The present invention relates to a system and method for simultaneously polling a plurality of mobile platforms operating within a given coverage region, and for providing a predetermined, dedicated return communications channel for each such mobile platform by which each mobile platform may communicate, via available satellite-based transponder resources (i.e., via one of a plurality of transponders), with a base station transceiver. The system and method of the present invention thus is able to poll and establish communications links with a group (or "batch") of mobile platforms virtually simultaneously as soon as each mobile platform being polled responds to the polling signal. Batch sizes will vary, and will be maximized to take advantage of available transponder and ground station resources. This is in contrast to prior developed polling schemes which sequentially poll one mobile platform at a time and then wait for a predetermined response time before polling another mobile platform. Since the present invention provides a dedicated return channel on which a given mobile platform is to respond, return communications links can be established substantially simultaneously with the base station via the satellite-based transponders.

The polling system and method of the present invention further implements a fixed "time out" period by which a mobile platform being polled must respond within. If a response is not received within this time period the dedicated return channel assigned thereto will be withdrawn and returned to a database maintained by a central controller, which tracks all of the return channel assignments currently being used by mobile platforms within the coverage region. In this manner, unused bandwidth is not wasted but rather can be made available for other mobile platforms requesting additional bandwidth. The central controller also controls the releasing of additional channels (i.e., bandwidth) to those mobile platforms requesting additional bandwidth. The central controller continuously updates its database of all return channel assignments that are being used by mobile platforms at any given time.

It is a principal advantage of the polling system and method of the present invention that groups (or "batches") of return communication links can be established with corresponding pluralities of mobile platforms very quickly and in an orderly fashion, in a manner that maximizes the use of unassigned transponder resources.

BRIEF DESCRIPTION OF THE DRAWINGS

The present invention will become more fully understood from the detailed description and the accompanying drawings, wherein:

FIG. 2 is a simplified illustration of a plurality of mobile platforms, in this instance illustrated as aircraft, being polled by a base station, and where several of the aircraft are responding to the polling signals on assigned, dedicated return communication channels while other aircraft ignore the polling signals and remain inactive;

FIG. 3 is a flowchart showing the steps of operation of the system and method in polling an inactive user;

FIG. 6 is a flowchart of the steps performed by the network operations center in the event a return communications link with a mobile platform is broken;

FIG. 7 is a flowchart of the steps performed by the network operations center and an affected mobile platform when a forward communications link is lost; and FIG. 8 is an illustration of three polling passes showing how the batch size of the polling signals can vary depending upon the total number of mobile platforms being polled.

DETAILED DESCRIPTION OF THE PREFERRED EMBODIMENTS

The following description of the preferred embodiment is merely exemplary in nature and is in no way intended to limit the invention, its application, or uses.

Figure 1:
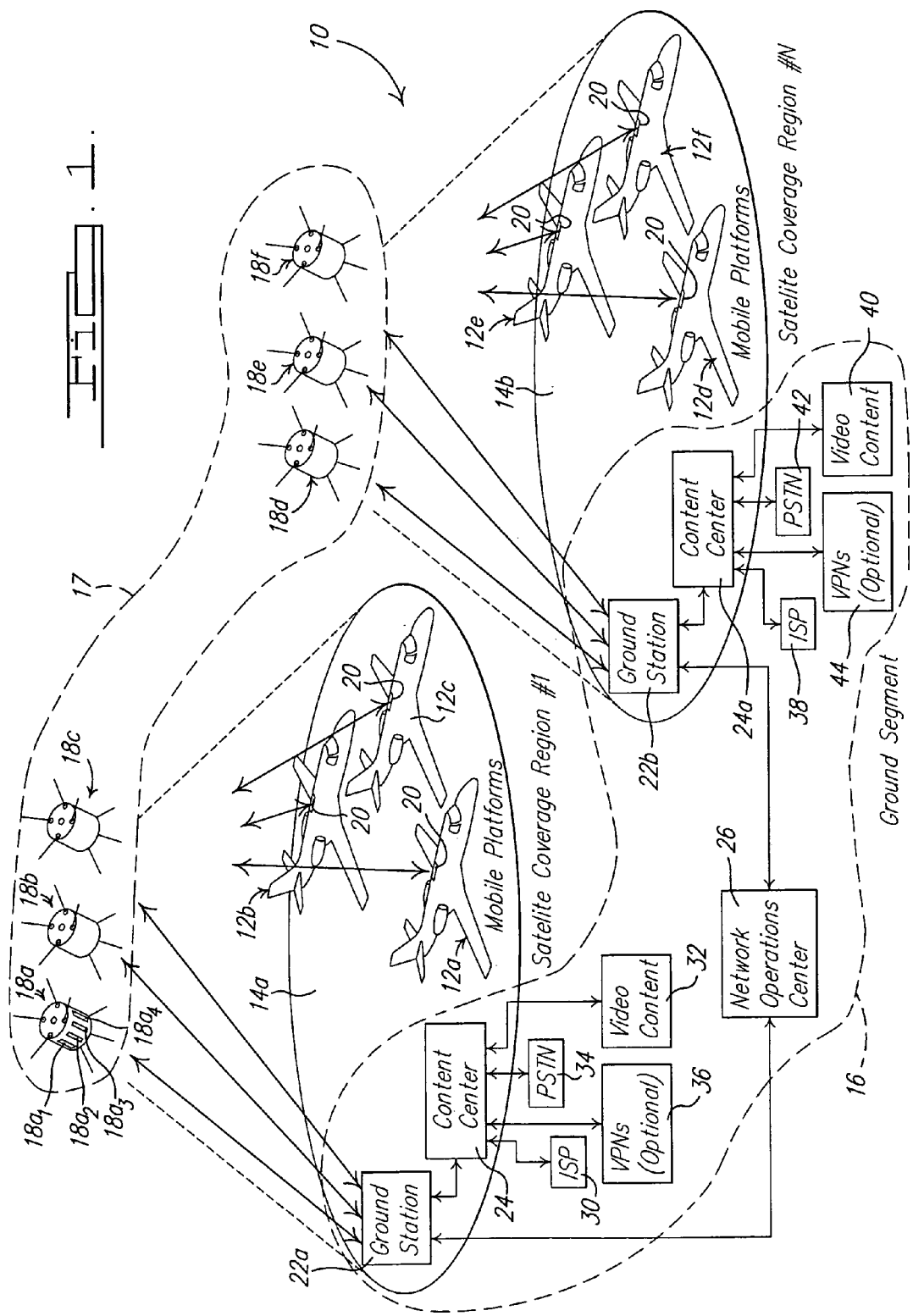
FIG. 1 is an illustration of the major components of a system which may be employed in implementing the polling system and method of the present invention.

Referring to FIG. 1, there is shown a system 10 in accordance with a preferred embodiment of the present invention. The system 10 is used to implement the polling method of the present invention to provide dedicated return communication channels to a plurality of mobile platforms operating within one or more predefined coverage regions. FIG. 1 illustrates the moving platforms 12a–12f as aircraft, but it will be appreciated that cruise ships or any other moving vehicle could represent a mobile platform. As such, the illustration of the mobile platforms as aircraft in FIG. 1, and the reference to the mobile platforms 12 as aircraft throughout the following description, should not be construed as limiting the present invention to only aircraft.

The aircraft 12a–12f are also illustrated as operating within a pair of distinct coverage regions 14a and 14b. The system 10 generally comprises a ground segment 16, a plurality of satellites 18a–18f forming a space segment 17, and a mobile system 20 disposed on each moving platform 12. The mobile system 20 may consist of an RF transceiver, suitable transmit and receive antennas, and an antenna controller for enabling the antennas to be mechanically or electronically steered to track a designated satellite while the aircraft 12a–12c are traveling through the coverage region 14a.

The space segment 17 may include any number of satellites 18 in each coverage region 14a and 14b needed to provide coverage for the entire region. The satellites 18 preferably comprise Ku or Ka-band satellites. Each of the satellites 18 are further located in a geostationary orbit (GSO) or a non-geostationary orbit (NGSO). Examples of possible NGSO orbits that could be used include low Earth orbit (LEO), medium Earth orbit (MEO) and a highly elliptical orbit (HEO). Each of the satellites 18 includes at least one radio frequency (RF) transponder, and more preferably a plurality of RF transponders. For example, satellite 18a is illustrated as having four transponders 18a1–18a4. It will be appreciated that each other satellite 18 could have a greater or lesser plurality of RF transponders as required to handle the communications traffic anticipated from the aircraft 12 operating within the coverage areas 14a and 14b.

Ground station 22a comprises an antenna and an RF transceiver with associated antenna control electronics needed for transmitting data content to the satellites 18. The antenna of the ground station 22a is also used to receive data content transponded by the transponders of each satellite 18 within the coverage region 14a. Ground station 22a may be located anywhere within the coverage region 14a. Similarly, ground station 22b, if incorporated, can be located anywhere within the second coverage region 14b.

A content center 24 may be in communication with a variety of external content providers and controls the transmission of video and data information received by it to the ground station 22a. The content center 24 is preferably in contact with an Internet service provider (ISP) 30. Optionally, a video content source 32, a public switched telephone network (PSTN) 34, and/or one or more virtual private networks (VPNs) 36 may also be in contact with the content center 24. The ISP 30 may be used to provide Internet access to each of the occupants of the aircraft 12. The video content source 32 may be used to provide live television programming to the occupants of the aircraft 12. A network operations center (NOC) 26 maintains databases of what return link channels are presently in use, as well as what return link channels are available for use by the aircraft 12. The NOC 26 also performs traditional network management, user authentication, customer service and billing tasks. The content center 24a associated with the ground station 22b in the second coverage region 14b would also preferably be in communication with an ISP 38, and optionally also with one or more of a video content provider 40, a PSTN 42 and a VPN 44.

Turning now to FIG. 2, the operation of the polling system of the present invention in establishing return communication links rapidly and in an orderly fashion with a plurality of aircraft operating within the coverage region 14a will be described. Although this description will focus on only coverage region 14a, it will be appreciated that the system 10 and method of the present invention will preferably be implemented in each distinct coverage region which the aircraft 12 is required to operate within. For simplicity, only satellite 18a has been illustrated as orbiting within the coverage region 14a. Also, the aircraft 12 can be considered as being within a single "batch" (i.e., group) for polling purposes.

The NOC 26 is provided with a list of "registered" users (i.e., aircraft 12) for which an account has been established. When an aircraft 12 is registered, some form of identification number associated with that particular aircraft is maintained by the NOC 26 in a polling database of authorized users (i.e., aircraft that have an account established with the NOC 26). The identification number may comprise an "ICAO" (International Communication Avionics Organization) number or any form of designation which uniquely identifies the aircraft 12. In addition, each aircraft 12 may be further designated as being "active" or "inactive". An active aircraft is one that currently has a return communications link established with the ground station 22a. An "inactive" aircraft is one that is authorized to use the system 10 (i.e., its ID code is maintained in the NOC's 26 polling database) but which has not established a return communications link with the ground station 22a. An aircraft 12 which needs to be removed from service for temporary or extended maintenance may be reported to the NOC 26, by the airline operating that particular aircraft, that that aircraft has been temporarily removed from service. Such an aircraft can then be removed from the NOC's 26 polling database. The NOC 26 maintains a separate database of all aircraft 12 having "inactive" status. Thus, only aircraft 12 having "active" status are maintained in the polling database of the NOC 26.

For purposes of simplicity, a single satellite 18a having a forward link transponder $18a_1$ and a return link transponder $18a_2$ is shown in FIG. 2. The term "forward link" is used to denote all transmissions of data content from the ground station $22_a$ to the aircraft 12 via the forward link transponder $18a_1$. The term "return link" is used to denote all transmissions of data content from the aircraft 12 to the ground station $22_a$ via the return link transponder $18a_2$. The return link transponder $18a_2$ is effectively subdivided into a plurality of narrow band "slots" or channels via code division multiple access (CDMA) multiplexing techniques, or alternatively via frequency division multiple access (FDMA), time division multiple access (TDMA) or other form(s) of multiple access techniques. Still further techniques are disclosed in U.S. Pat. No. 5,103,459 to Gilhousen et al., which is hereby incorporated by reference into the present application. Each narrowband channel comprises a predetermined bandwidth, for example, 16 Kbps. However, it will be appreciated that a larger or smaller bandwidth channel could be incorporated.

Referring now to FIGS. 2 and 3, the polling system and method of the present invention will be described. It is a principal advantage of the present invention that multicast forward link polling messages are transmitted from the ground station 22a via the forward link transponder $18a_1$ to a group, or "batch" of the inactive users in the NOC's 26 inactive user polling database simultaneously. A polling batch may include a number of aircraft larger or smaller than 12, depending on available transponder resources (e.g. available return channels). In the present example, the single batch of aircraft shown in FIG. 2 comprises a batch of nine aircraft.

It is a further advantage that the multicast polling messages each carry several items of important information, namely, the ID code of the aircraft for which the message is intended, information as to which satellite should be tracked, the frequency of the return link transponder $18a_1$ assigned to the aircraft, and the CDMA or other form of multiple access code to be used by the mobile system 20 of the aircraft for communications with the ground station 22a. The specific satellite, return link transponder, transponder frequency and CDMA code (or other form of multiple access code) can collectively be viewed as the preliminary "return channel." The multicast polling messages are transmitted to all aircraft 12 that have not already established return communications links with the ground station 22a, as indicated at step 50 in FIG. 3, and as indicated by forward link signals 51 in FIG. 2, through a series of batch polls. In this regard, the operators of each aircraft 12 in each batch poll will be advised of the frequency on which the polling signals will be transmitted, and this frequency will be known to all registered users. All aircraft 12 operating under inactive status receive all of the polling signals and the mobile system 20 of the aircraft determines which polling signal is directed to it. This is accomplished by having the mobile system 20 of each aircraft 12 look for the ID code of its aircraft 12 in all of the multicast batch polling messages it receives.

The NOC 26 then waits for a predetermined time period, for example 5 seconds, for responses to be received via the return link transponder $18a_2$ on the preliminary return channels, as indicated at step 52 in FIG. 3. These return link responses are indicated by arrows 53 in FIG. 2. At the end of the polling period, a determination is made as to which preliminary return channels the NOC 26 has received responses on, as indicated in step 54. Those preliminary return channels on which the NOC 26 has received a response from an aircraft 12 are then removed from the NOC's database of available preliminary return channels maintained by the NOC, and the particular aircraft 12 that has responded on the preliminary return channel is also removed from the NOC's inactive user polling database, as indicated at step 56. Those aircraft 12 that have not responded on their preliminary return channels are maintained in the NOC's 26 inactive user polling database and the unused preliminary return channels are added to the NOC's database of available CDMA (or other multiple access) return channels, as indicated at step 58. The process then repeats within a short time, for example 5 seconds, with the NOC 26 again transmitting a batch of multicast polling messages via the forward link transponder $18a_1$ to the next set of aircraft 12 listed in its inactive user polling database with preliminary return channel information accompanying each of the polling messages. This process is repeated (i.e., cycled through) until all inactive (i.e., unassigned) aircraft have been polled.

It is a principal advantage of the polling system and method of the present invention that batches (i.e., groups) of aircraft 12 are polled simultaneously and provided with preliminary return channel designations using batch sizes as large as possible, rather than polling each aircraft individually and waiting for a response. By polling all aircraft 12 simultaneously in batches and providing preliminary return channels on which each aircraft in each batch can respond immediately, numbers of aircraft can be allowed to establish return communications links with the ground station 22a in a very rapid, orderly fashion.

Figure 4:
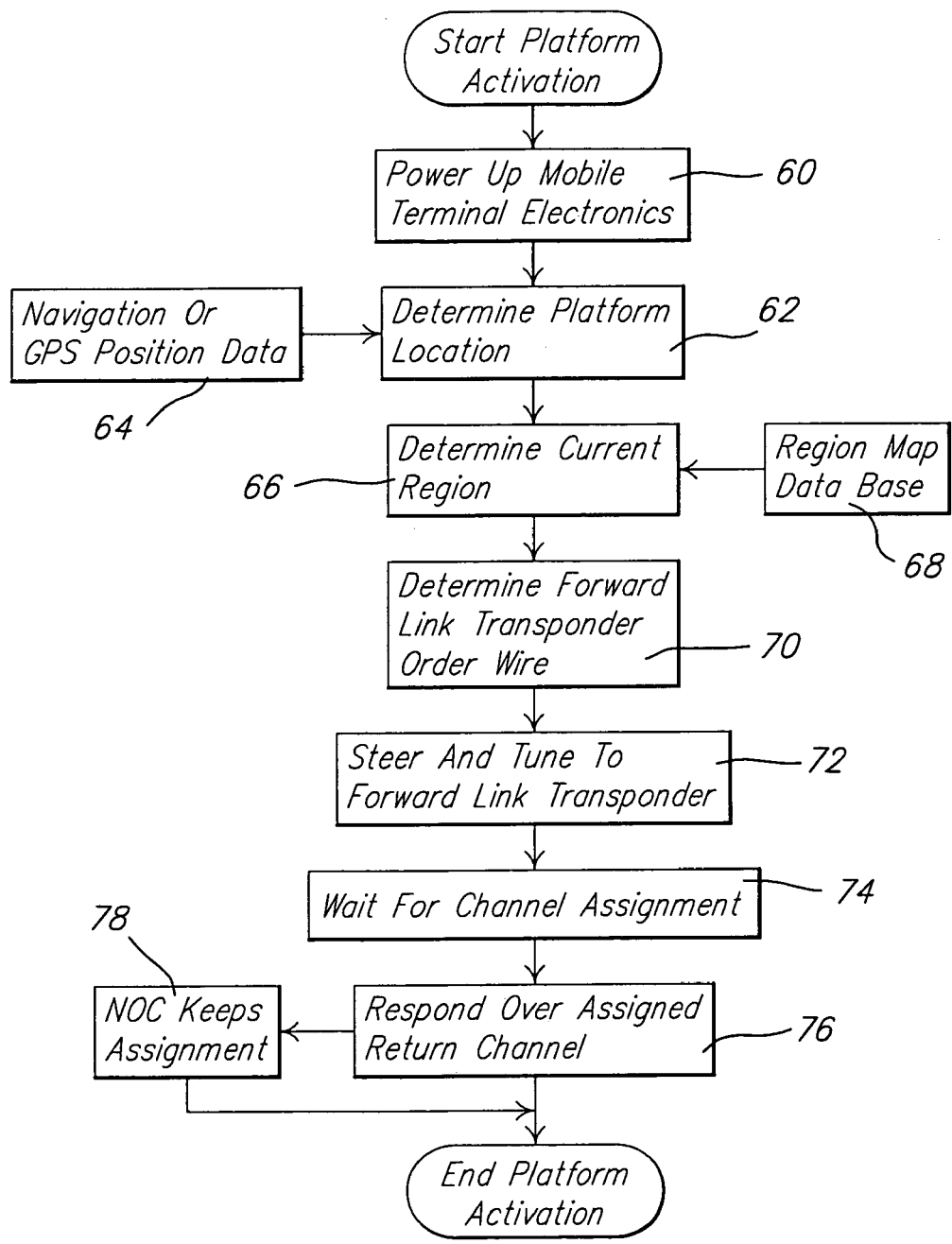
FIG. 4 is a flowchart of a platform activation process that a mobile platform goes through in preparing to establish a communications link with a ground station.

Turning now to FIG. 4, a more detailed description of the process that each aircraft 12 goes through in establishing a return communications link with the NOC 26 will be provided. Any aircraft 12 entering or operating within the coverage region 14a must first power up its mobile system 20, as indicated at step 60. The mobile system 20 must next determine the location of its associated aircraft 12 within the coverage region 14a, as indicated at step 62. This is accomplished with the aid of position data from the aircraft's 12 navigation system or global positioning system (GPS) as indicated by block 64. If more than one coverage region 14a exists, then the mobile system 20 also determines the coverage region that it is presently operating within, as indicated at step 66. This can be accomplished via a "region map" database maintained by the mobile system 20, as indicated by block 68.

Referring further to FIG. 4, the mobile system 20 next determines the forward link transponder to which it needs to tune, as indicated at step 70. The mobile system 20 then steers its receive antenna toward the forward link transponder $18a_1$ and tunes to a known frequency on which this transponder is operating, as indicated at step 72. The mobile system 20 then waits and listens for the multicast polling messages from the forward link transponder $18a_1$ which includes the aircraft's 12 preliminary return channel assignment, as indicated at step 74. Once the aircraft 12 receives the polling message with its ID code together with its preliminary return channel assignment, the aircraft 12 responds on the assigned preliminary return channel, as indicated at step 76. The NOC 26 then removes the preliminary return channel from its database of available preliminary return channels, as indicated at step 78, and the platform activation process is complete.

Figure 5:
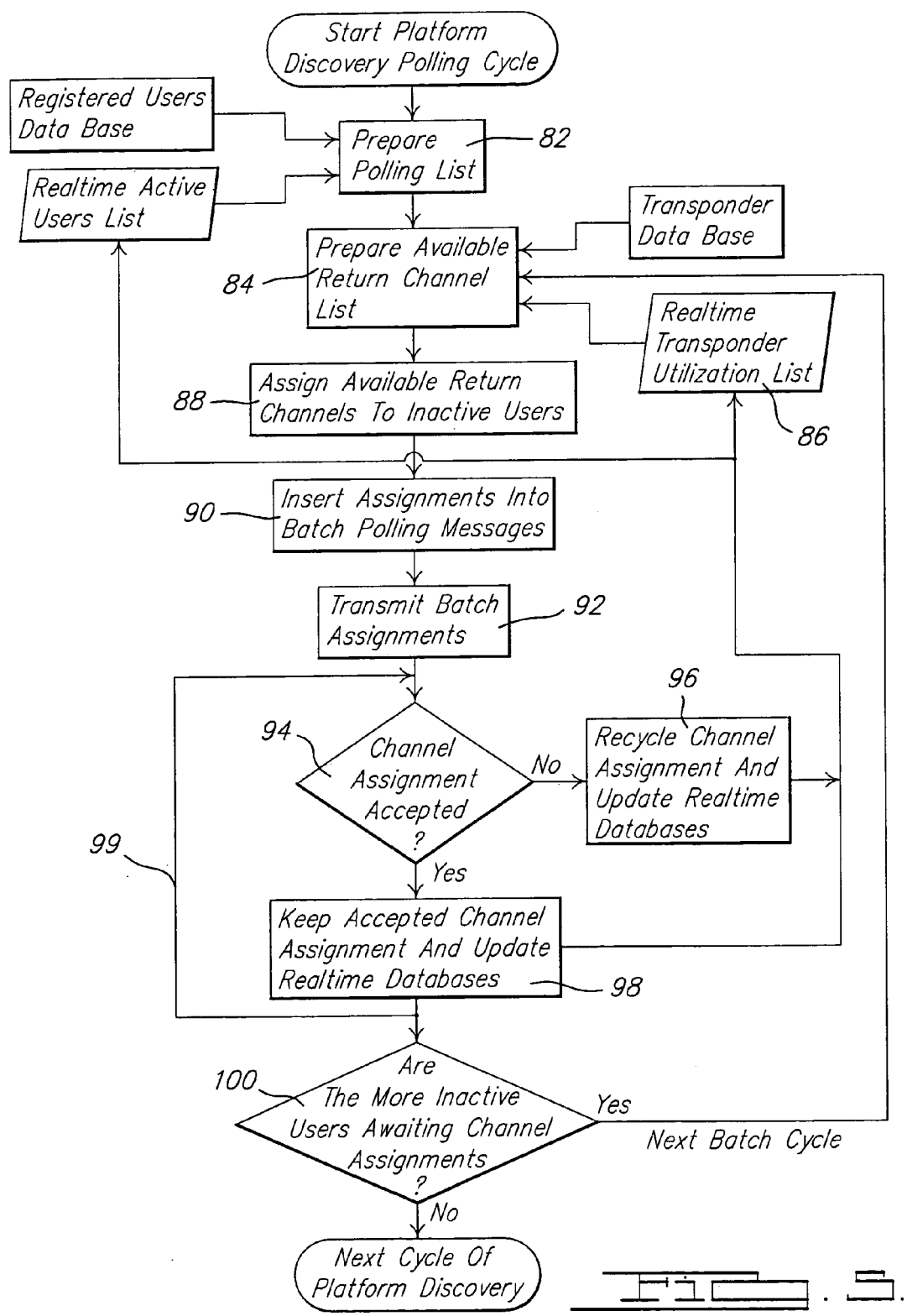
FIG. 5 is a more detailed flowchart of the steps performed in polling a mobile system.

Referring now to FIG. 5, a more detailed description of the process by which the NOC 26 establishes a return communications link with a given aircraft 12 will be provided. The NOC 26 continuously prepares/updates its inactive user polling database by removing those aircraft 12 that establish return communications links from its database of inactive users, as indicated at step 82. From its polling list, the NOC 26 creates a list of available preliminary return channels, as indicated at step 84. The NOC 26 creates this list of available preliminary return channels by subtracting currently used channel assignments from a real time transponder utilization list, indicated at step 86. The real time transponder utilization list represents a list of those transponder channels presently being used at a given time. The NOC 26 also maintains a transponder database of all return link transponder channels available when preparing the available preliminary return channel list.

With further reference to FIG. 5, the NOC 26 then assigns available return channels to as many inactive users in its inactive user polling database that the next batch can accommodate, as indicated at step 88. The NOC 26 then inserts the preliminary return channel assignments into a message body of each forward link polling message, as indicated at step 90. The channel assignments are then transmitted over the forward link transponder $18a_1$ as a single batch of multicast messages, as indicated at step 92. The NOC 26 then waits a predetermined time period, for example, 5 seconds, and makes a determination as to which return channel assignments have been accepted by previously inactive users, as indicated at step 94. Those channel assignments that have not been accepted are then added back to the real time database of available preliminary return channels, as indicated at step 96, and used by the NOC 26 in subsequent polling. The NOC 26 then updates its real time database of active users to include those users (i.e., aircraft 12) that have responded on their assigned preliminary return channels, as indicated at step 98. The NOC 26 then checks all the channel assignments in the batch, as indicated by arrow 99. The NOC 26 then checks its inactive user database to determine if there are additional inactive users awaiting preliminary return channel assignments, as indicated at step 100 and, if so, creates another batch polling message for the next set of inactive users. If there are no additional inactive users awaiting channel assignments in this pass, then the NOC 26 begins a new cycle of platform discovery by starting over with polling an updated inactive user list.

It is also an important feature of the system 10 and method of the present invention that each active user is allowed to request additional bandwidth to meet its bandwidth needs. Accordingly, after responding on the preliminary return channel assigned to it by the NOC 26, a given aircraft 12 may request an additional channel or "slot" and, if approved by the NOC 26, the mobile system 20 will be given a larger bandwidth slot, for example, 64 Kbps, on which to conduct return link communications. The mobile system 20 releases the additional bandwidth channel when it is no longer needed and this channel is added back into the NOC's 26 real time database of available return channels.

Referring to FIG. 6, in the event that the return communications link with any aircraft 12 is broken, then the NOC 26 reallocates the return link channel previously assigned to that aircraft, as indicated at step 102. The NOC 26 then ceases forward link unicast traffic to the user, as indicated at step 104 and then returns the user to the inactive user list, as indicated at step 106. The NOC 26 then adds the user to the polling database, as indicated at step 108. During the next polling sequence by the NOC 26, the NOC will provide a new preliminary return channel assignment with the polling signal addressed to the affected aircraft 12.

With brief reference to FIG. 7, if the forward communications link should drop out for any reason, then the forward link will time out at the mobile system 20 of the affected aircraft 12, as indicated at step 110. The mobile system then ceases to transmit on the assigned return channel, as indicated at step 112, and the assigned return link then times out at the NOC 26, as indicated at step 114. The NOC 26 then ceases return link communications and returns the user to the inactive user list, as indicated at step 116. Thereafter, the NOC 26 will attempt to establish a communication link with the affected aircraft 12 by transmitting a new preliminary return channel assignment in the body of the polling signal directed to the aircraft.

In the event more than one distinct coverage region is employed, the NOC 26 coordinates a handoff of the forward and return communications links with the aircraft while the aircraft is traveling through a designated overlap between the two regions. This process is described in detail in copending U.S. application Ser. No. 09/851,369 filed concurrently herewith.

With reference to FIG. 8, it can be seen how the size of the batches of polling messages is varied as aircraft (denoted by "a/c" in FIG. 8) respond to the batch polling messages. During an initial polling pass three batches of polling messages, each directed to 10 different aircraft 12, are transmitted. Aircraft numbers 3, 4, 13, 24, and 28 accept (i.e., respond) their polling messages. The second polling pass involves polling only those aircraft 12 that did not respond to their respective polling message in the initial polling pass. It will be noted in this example that the batches are limited to eight aircraft 12 per batch in the second polling pass due to changing system resources with four batches rather than three.

In the second polling pass aircraft 5, 7, 11, 25 and 29 respond to their polling messages. Thus, in the third polling pass these aircraft 12 are removed from the NOC's 26 polling list. The batch size is further reduced in this example to a maximum of six aircraft 12, with only those aircraft that have not responded to a previous polling message being polled.

The polling system and method of the present invention thus provides a means for establishing return communications links with groups of mobile platforms traveling within a given coverage region in a quick, orderly manner. The system and method of the present invention does not require the network operations center controlling the establishment of return communications links with numbers of mobile platforms to wait for one user at a time to acknowledge a polling signal before polling other users. This facilitates establishing communication links in a much more expeditious and orderly manner than previously developed polling systems and methods.

Those skilled in the art can now appreciate from the foregoing description that the broad teachings of the present invention can be implemented in a variety of forms. For example, batch round robin polling principles as described herein could be used in a cell phone environment. It will also be appreciated that the variations of the preferred embodiments in specific embodiments herein could readily be implemented in other ones of the embodiments. Therefore, while this invention has been described in connection with particular examples thereof, the true scope of the invention should not be so limited since other modifications will become apparent to the skilled practitioner upon a study of the drawings, specification and following claims.

What is claimed is:

1. A method for establishing a radio frequency (RF) communications link between an RF base transceiver and a mobile platform carrying an RF transceiver, via a satellite-based transponder, wherein said mobile platform is traveling within a predetermined coverage region, the method comprising:

a) using a control center to maintain a list of registered mobile platforms, wherein said registered mobile platforms are pre-authorized to make use of said satellite-based transponder to transmit and receive data content to and from said base transceiver;

b) using said control center to cause said base transceiver to transmit a plurality of polling messages substantially simultaneously, said polling messages radiating across said coverage region, and wherein each said polling message carries information addressed to a specific one of said registered mobile platforms and includes a preliminary, dedicated return channel which its intended said mobile platform is to use for communicating with said base transceiver; and causing said control center to cause each said polling message to timeout if its associated said mobile platform does not transmit a response with a predetermined time on its said preliminary, dedicated return channel.

2. The method of claim 1, wherein said preliminary, dedicated return channel has a minimum predetermined bandwidth.

3. The method of claim 1, wherein said control center causes each of said polling messages whose respective mobile platforms do not respond within said predetermined time on their said preliminary, dedicated return channels to timeout simultaneously.

4. The method of claim 1, wherein each said preliminary, dedicated return channel comprises a predetermined bandwidth; and
wherein said control center maintains a database of said return channels in use at all times.

5. The method of claim 4, wherein said control center removes any one of said mobile platforms from said polling database upon receiving a response therefrom on said mobile platform's said preliminary, dedicated return channel.

6. The method of claim 1, wherein each said polling message includes a message body comprising:
an aircraft identification code;
information concerning which one of a plurality of satellites said aircraft has been assigned to track;
a frequency of a specific transponder for establishing a return communications link; and
a multiple access code.

7. The method in claim 4, wherein said central controller adjusts a size of a batch of said polling messages in a subsequent polling sequence in accordance with available resources of said satellite-based transponder and said RF base transceiver.

8. A method for establishing radio frequency (RF) communications links between at least one RF base station transceiver and a plurality of mobile platforms carrying RF transceivers, via at least one satellite-based transponder, wherein said mobile platforms are traveling within a predetermined coverage region, the method comprising the steps of:
a) using an operations center to maintain a list of registered mobile platforms, wherein said registered mobile platforms are pre-authorized to make use of said satellite-based transponder to transmit and receive data content to and from said RF base station transceiver; and
b) using said operations center to cause said RF base station transceiver to transmit a plurality of polling messages simultaneously to all of said registered mobile platforms which are not then communicating with said RF base station transceiver, each said polling message being addressed to a specific one of said mobile platforms and designating a dedicated return channel for its associated mobile platform to respond on;
c) waiting a predetermined period of time for a response from each of said registered mobile platforms which are not yet in communication with said RF base station transceiver; and
d) causing those said polling messages for which a response is not received on their said dedicated return channels within said predetermined period of time to timeout substantially simultaneously.

9. The method of claim 8, further comprising the step of causing said operations center to maintain a database of said return channels in use at all times.

10. The method of claim 8, further comprising the step of causing said operations center to maintain a database of all said return channels which are not in use at any given time.

11. The method of claim 8, further comprising the steps of:
causing said mobile platform to determine its location within said coverage region prior to responding to its associated said polling message;
causing said mobile platform to determine the location of said satellite-based transponder;
causing said mobile platform to point an antenna thereof in a direction of said satellite-based transponder;
causing a transceiver carried by said mobile platform to tune to a previously determined frequency on which said polling messages are being transmitted by said satellite-based transponder; and
causing said transceiver to generate a response signal on said dedicated return channel.

12. The method of claim 11, further comprising the steps of:
using said control center to define a predetermined bandwidth on said dedicated response channel;
once said mobile platform establishes a communications link with said RF base station transceiver via said satellite-based transponder, causing said mobile platform to request additional bandwidth;
causing said operations center to determine if said requested additional bandwidth is presently available; and
if said additional bandwidth is presently available, using said operations center to cause said RF base station transceiver to transmit an authorization to said mobile platform to use a larger bandwidth response channel for subsequent communications with said RF base station transceiver.

13. A method for establishing a plurality of radio frequency (RF) communications links between an RF base station transceiver and a plurality of mobile platforms each carrying an RF transceiver, via a satellite-based transponder, wherein said mobile platforms are all traveling within a predetermined coverage region, the method comprising the steps of:
a) causing each said mobile platform to tune an RF transceiver thereof to a known, predetermined frequency at which polling messages are being transmitted by said satellite-based transponder;
b) using an operations center to maintain a list of mobile platforms authorized to communicate with said RF base station transceiver;
c) using said operations center to cause said RF base station transceiver to transmit a plurality of polling messages simultaneously to all of said authorized mobile platforms which are not then communicating with said RF base station transceiver, each said polling message being addressed to a specific one of said mobile platforms and designating a dedicated return channel for its associated said mobile platform to respond on;
d) waiting a predetermined period of time for a response from each of said authorized mobile platforms which are not yet in communication with said RF base station transceiver; and e) causing at least one of said mobile platforms to generate a response on its associated said dedicated return channel to establish a communications link with said RF base station transceiver, wherein each of said polling messages to timeout substantially simultaneously if a response on its associated said dedicated return channel is not received within a predetermined time period.

14. The method of claim 13, further comprising the step of causing said operations center to maintain a database of unused return channels at any given time which may be assigned as preliminary return channels with subsequently transmitted polling signals.

15. A system for establishing a plurality of radio frequency (RF) communications links between an RF base station transceiver and a plurality of mobile platforms each carrying an RF transceiver, wherein said mobile platforms are all traveling within a predetermined coverage region, the system comprising:

an RF base station transceiver disposed within said coverage region;

a network operations center (NOC) for maintaining a database of available return communication channels and a database of mobile platforms authorized to establish communication links with said RF base station transceiver;

a satellite-based transponder disposed in orbit over said predetermined coverage region;

said NOC operating to cause said RF base station transceiver to transmit a plurality of multicast polling messages, via said satellite-based transponder, each addressed to a specific one of said mobile platforms, each said polling message designating a dedicated return channel on which its associated said mobile platform is to communicate with said RF base station transceiver; and wherein said polling messages that are not responded to by their associated said mobile platforms timeout within a given time period after being transmitted from said RF base station transceiver.

16. The system of claim 15, wherein said dedicated return channels associated with said polling signals that timeout are re-entered into said database of said NOC.

* * * * *